UNITED STATES PATENT OFFICE.

HUGH A. GALT, OF BARBERTON, OHIO.

MANUFACTURE OF GLASS.

1,312,784.  Specification of Letters Patent.  Patented Aug. 12, 1919.

No Drawing. Application filed December 15, 1917. Serial No. 207,289.

*To all whom it may concern:*

Be it known that I, HUGH A. GALT, citizen of the United States, residing at Barberton, in the county of Summit and State of Ohio, have invented certain new and useful Improvements in the Manufacture of Glass, of which the following is a specification.

This invention relates to the manufacture of glass, and has for its principal objects the provision of a glass batch which is cheaper and in some respects more satisfactory than those now employed, and which will permit the use of niter cake, cylinder cake or other similar substances in place of certain of the more expensive substances now in use.

Niter cake, a biproduct in the manufacture of nitric acid from sodium nitrate, and cylinder cake, a biproduct in the manufacture of hydrochloric acid from sodium chlorid, consists of a relatively large proportion of sodium bisulfate, $NaHSO_4$, with a relatively smaller proportion of sodium sulfate, $Na_2SO_4$. While having the sodium content necessary as an ingredient in glass, they have heretofore been considered impractical to use in that relation in any quantity because they are deliquescent, absorbing large amounts of water from the air and are also acid. As a consequence they cause the formation of what is known as "salt water," a liquid which lies on the surface of the molten batch, attacks the pot or tank blocks and interferes with the melting and handling operations, and which also produces a scum which impairs the clarity and quality of the glass. Moreover the acid or bisulfate portion of the niter cake attacks the pots or tank blocks, and its fumes attack the exposed metal and other substances in the workroom. Again, niter cake has not heretofore been used because it has not been feasible to store it in reserve in pulverized or finely divided form, because the water absorbed thereby makes the mass mushy or even liquid and therefore difficult to handle, while its strong acid effect is also likely to produce solution of nails in the bin or other foreign substances which might impair the quality of the glass.

The present invention is directed toward the proper utilization of niter cake, cylinder cake or the like in a glass batch, and therefore aims to put to use substances which have heretofore been considered of little or low value or to substitute the same for more costly materials.

The niter cake (and by this term hereinafter I mean to include cylinder cake and similar substances containing sodium bisulfate) may be utilized in a glass batch in various ways, a number of which will be referred to more in detail.

For the purpose of comparison of the various new batches with the present practice the following typical ordinary soda ash mix may be used as a basis.

*Typical mix (Formula I).*

| | |
|---|---|
| Sand | 1000 parts |
| Soda ash ($Na_2CO_3$) | 298 parts |
| Salt cake ($Na_2SO_4$) | 60 parts |
| Salt (NaCl) | 25 parts |
| Limestone ($CaCO_3$) | 309 parts |
| Coal (C) | 3 parts |
| Arsenic ($As_2O_3$) | 5 parts |

One of the new batches constitutes departure from the foregoing only in the substitution of a mixture of niter cake and soda ash (or an equivalent for soda ash) for the 60 parts of salt cake in the above batch. The new batch in tabulated form is as follows:

*Formula II.*

| | |
|---|---|
| Sand | 1000 parts |
| Soda ash | 298 parts |
| Mixture: | |
|   Soda ash 16 parts | |
|   Niter cake 50 parts | 66 parts |
| Salt | 25 parts |
| Limestone | 309 parts |
| Coal | 3 parts |
| Arsenic | 5 parts |

The mixture in this batch is preferably made up of 50 parts of niter cake and just sufficient soda ash to neutralize the free acid or the acid effect of the niter cake, and may, for example, be approximately 16 parts. If bicarbonate of soda, $NaHCO_3$, is used in place of soda ash (and it will serve equally as well) approximately $1\frac{6}{10}$ times as much is required as the amount of soda ash. The quantity of soda ash or bicarbonate is of course readily calculated chemically when the acid value of the particular batch of niter cake is known.

The two substances forming the "mixture" may be ground to a relatively fine condition and mixed together as a homogeneous mass which is used in the mix as an entity, or the two substances may be separately introduced into the batch in the required proportions for the "mixture." In either case the resulting compound is substantially salt cake, or, more accurately, the effect is as though salt cake has been introduced into the batch, although the "mixture" has permitted the use of niter cake never before so used. The reaction between the niter cake and soda ash or bicarbonate, as the case may be, probably does not occur until a state of fusion is reached. Nevertheless neutralization of the niter cake in this manner disposes of its free acid or acid effect, prevents corrosion of the pots or surrounding metal objects, and avoids any possibility of the harmful effects of "salt water." Grinding of the materials is not essential as the niter cake, for example, may be in lump form when separately introduced into the batch, as above stated.

Under normal conditions the foregoing substitution of the "mixture" for the salt cake involves a considerable saving in cost, a saving which is the greater under the present abnormal war conditions which have caused salt cake to rise in cost from $10.00 to $12.00 a ton in 1913 to $25.00 to $30.00 a ton today. A further advantage is due to the fact that the salt cake equivalent or substitute produced by the mixture of niter cake and soda ash or bicarbonate is very much purer than commercial salt cake, as a consequence of which the quality and value of the glass are enhanced.

As an alternative, another "mixture" consisting of niter cake and limestone may be employed, the limestone serving in this case to neutralize the acid effect of the niter cake and also furnish gypsum or calcium sulphate when the latter is either useful or harmless in the batch. This is a cheaper mixture than the first, due to the relatively lower cost of the limestone. On the other hand, such a mixture may require to be roasted before adding to the batch to avoid early fusion of the niter cake and production of "salt water" before reaction with the limestone occurs. Still another mixture employs lime, either slaked, $CaO_2H_2$, or unslaked, $CaO$, as a neutralizing agent for the acid effect of the niter cake. Such material would probably not require preliminary roasting before adding to the batch. All of these lime bases are of course added in amounts calculated to be approximately sufficient to neutralize the acid effect of the particular niter cake at hand. One such mix, utilizing ground limestone (preliminarily roasted with the niter cake) as the neutralizing base is as follows:

*Formula III.*

Sand _____ 1000 parts
Mixture:
   607.5 niter cake ⎱ calcined__ 708 parts
   179.0 limestone ⎰
Limestone _____ 181 parts
Coal _____ 45 parts Another mix employing slaked lime is as follows:

*Formula IV.*

Sand _____ 1000 parts
Mixture:
   Calcium hydrate 138 parts ⎱ 738 parts
   Niter cake _____ 600 parts ⎰
Limestone _____ 330 parts
Coal _____ 45 parts Formulæ III and IV may be used at exceedingly low cost because of the cheapness of the niter cake and lime as compared with the soda ash and salt cake of the typical mix, Formula I.

It will of course be understood that the foregoing formulæ indicating a part of the possible modifications of the invention are merely illustrative and that the materials employed and the proportions thereof are capable of wide variation.

What I claim is:—

1. The process of making glass which consists in mechanically mixing together finely divided niter cake and a neutralizing base, adding such mixture to a lime silica batch, and fusing.

2. The process of making glass which consists in forming a mechanical mixture of finely divided niter cake and a base in sufficient quantity to neutralize the acid effect of the niter cake, adding such mixture to a lime silica batch, and fusing.

3. The process of making glass, which consists in forming a mechanical mixture of finely divided niter cake and a calcium compound as a neutralizing reagent, adding such mixture to a lime silicia batch, and fusing.

4. The process of making glass which consists in forming a mechanical mixture of finely divided niter cake and hydrate of lime, adding such mixture to a lime silicia batch, and fusing, In testimony whereof I affix my signature.

HUGH A. GALT.